(12) United States Patent
Murdoch et al.

(10) Patent No.: US 11,989,614 B2
(45) Date of Patent: May 21, 2024

(54) DAISY CHAIN ANTENNA

(71) Applicant: SATO HOLDINGS KABUSHIKI KAISHA, Tokyo (JP)

(72) Inventors: Graham Murdoch, St Peters (AU); Tai Wai Pong, St Peters (AU); Ganesh Nagendra, St Peters (AU); Yuxin Sun, St Peters (AU)

(73) Assignee: SATO HOLDINGS KABUSHIKI KAISHA, Tokyo (JP)

(*) Notice: Subject to any disclaimer, the term of this patent is extended or adjusted under 35 U.S.C. 154(b) by 248 days.

(21) Appl. No.: 17/608,614

(22) PCT Filed: Jun. 18, 2020

(86) PCT No.: PCT/IB2020/055674
§ 371 (c)(1),
(2) Date: Nov. 3, 2021

(87) PCT Pub. No.: WO2020/254993
PCT Pub. Date: Dec. 24, 2020

(65) Prior Publication Data
US 2022/0230004 A1    Jul. 21, 2022

(30) Foreign Application Priority Data

Jun. 20, 2019  (AU) ............................. 2019902158

(51) Int. Cl.
*G06K 7/10* (2006.01)
(52) U.S. Cl.
CPC .............................. *G06K 7/10356* (2013.01)
(58) Field of Classification Search
CPC ................................................ G06K 7/10356
(Continued)

(56) References Cited

U.S. PATENT DOCUMENTS

2014/0118160 A1* 5/2014 White ................ G08C 17/02
340/870.01
2015/0304611 A1* 10/2015 Nakase ................ H04N 7/18
348/143
(Continued)

FOREIGN PATENT DOCUMENTS

AU    2017225008 A1    9/2017
EP    2 259 212 A1    12/2010
(Continued)

OTHER PUBLICATIONS

International Search Report dated Sep. 10, 2020, issued in counterpart International Application No. PCT/IB2020/055674 (3 pages).
(Continued)

*Primary Examiner* — Allyson N Trail
(74) *Attorney, Agent, or Firm* — WHDA, LLP

(57) ABSTRACT

An RFID system (200) includes an RFID reader (202), an antenna array (204) and a length compensation unit (215). The RFID reader (202) is configured to interrogate RFID antennas. The antenna array (204) includes two or more RFID antennas (206) connectable to the RFID reader (202) via a series of cable links (208). Each RFID antenna (206) is associated with a respective cable link (208), and each cable link (208) has a cable length. The length compensation unit (215) is associated with each RFID antenna (206), and is configured to adjust a total cable length between the RFID reader (202) and a respective RFID antenna (206) to be an effective cable length.

14 Claims, 22 Drawing Sheets

(58) Field of Classification Search
USPC .......................................................... 235/451
See application file for complete search history.

(56) References Cited

U.S. PATENT DOCUMENTS

2020/0161742 A1* 5/2020 Leitermann ............ G16H 40/20
2021/0192156 A1* 6/2021 Koch ................. G06K 7/10346

FOREIGN PATENT DOCUMENTS

| JP | 2011-91500 A | 5/2011 |
|---|---|---|
| WO | 2010/025516 A1 | 3/2010 |

OTHER PUBLICATIONS

English translation of Office Action dated Dec. 27, 2022, issued in counterpart JP Application No. 2021-574807. (2 pages).

* cited by examiner

DAISY CHAIN ANTENNA

CROSS-REFERENCE TO RELATED APPLICATIONS

This application claims the benefit of priority of AU Application No. 2019902158, filed on 20 Jun. 2019 which is incorporated by reference herein, in its entirety, and made a part of this specification.

TECHNICAL FIELD

The present disclosure broadly relates to radio frequency antennas and, more particularly, a non-limiting embodiment relates to an antenna configuration for a radio frequency identification system.

BACKGROUND

Radio frequency identification (RFID) systems typically include one or more antennas that can communicate with RFID transponders (or "tags"), as well as an RFID reader (or "interrogator") in communication with the one or more antennas. The antennas send radio frequency (RF) signals to the RFID tags and any response received from an RFID tag by the antenna(s) is relayed to the reader for further processing.

In RFID systems where multiple antennas are used, for example for inventory tracking in a large area or volume such as in warehouse shelving and the like, operation of the antennas is typically controlled by one or more readers that are in communication with the antennas. FIG. 1A of the drawing illustrates a prior art system where a large shelf 100 has four overlapping antennas 104, each connected via a cable 103 to a port 102 of an RFID reader 101. The reader 101 is in communication with each of the antennas 104 that transmit RF signals so as to identify RFID tags that may be present on the shelf 100.

A disadvantage of the prior art system illustrated in FIG. 1A, is that a system with several antennas will result in a lot of cabling being used as each separate antenna coil 104 requires its own length of cable 103 to connect to the reader 101. This can be quite cumbersome and can take up a lot of space.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

In one aspect there is provided an RFID system comprising: an RFID reader configured to interrogate RFID antennas; an antenna array comprising two or more RFID antennas connectable to the RFID reader via a series of cable links, each RFID antenna associated with a respective cable link, each cable link having a cable length; a length compensation unit associated with each RFID antenna, the length compensation unit configured to adjust a total cable length between the RFID reader and respective RFID antenna to be an effective cable length.

Each RFID antenna has an antenna impedance, and each antenna's respective cable link has a cable impedance, and the antenna impedance may be different to the cable impedance so that the RFID antenna and its respective cable link are impedance mismatched. The length compensation unit associated with an RFID antenna may be configured to adjust for the total cable length between the RFID reader and the respective RFID antenna so that reflection resulting from said impedance mismatch has a predefined phase.

The antenna impedance of an RFID antenna may be transformed along the effective cable length to a final impedance having a resistance and substantially no reactance.

The antenna impedance may equal an antenna resistance without reactance, and the antenna impedance may be transformed along the effective cable length to have intermediate impedance values including reactance. The final impedance may be substantially equal to the antenna resistance without reactance.

The system may further comprise a controller configured to activate one RFID antenna at a time by communicating a first control signal to the antenna array. The system may further comprise a bypass switch associated with each RFID antenna, the bypass switch being responsive to the first control signal so as to either bypass the respective RFID antenna or connect the respective RFID antenna to the RFID reader. The total cable length may be a variable length depending on which one of the two or more RFID antennas is an active antenna, and the total cable length comprises a sum of cable lengths for each cable link connecting the RFID reader and the active antenna. The length compensation unit associated with the active antenna may adjust the total cable length between the RFID reader and the active antenna to be the effective cable length.

The length compensation unit may comprise a configuration of reactive electronic components that emulate a lengthening or shortening of the total cable length. The effective cable length may be the sum of the total cable length and a compensation length provided by the length compensation unit of an active antenna. The effective cable length may be substantially equal to a defined length.

Each length compensation unit may be configured to have a different compensation length, each unit's compensation length being a function of a number of cable links between said compensation unit and the RFID reader.

The compensation length of each length compensation unit may be adjustable.

The two or more RFID antennas of the antenna array may be connected in a daisy chain configuration via the series of cable links.

The controller may further be configured to communicate a second control signal to at least one length compensation unit for setting an adjustable compensation length of the at least one unit.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

Embodiments of the disclosure are now described by way of example with reference to the accompanying drawings in which.

and

Figure 16:
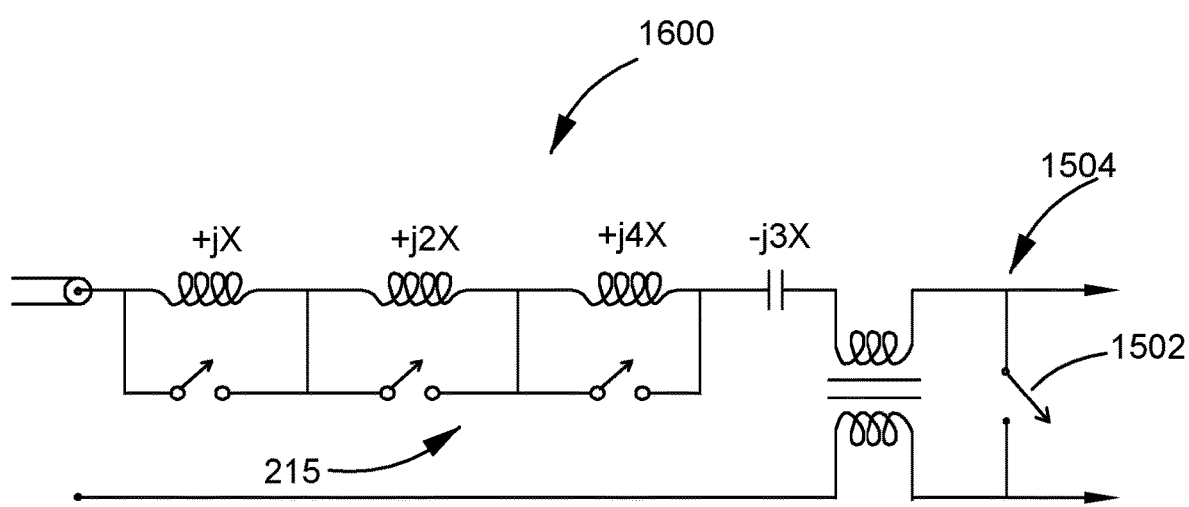

FIG. 16 is a schematic representation of another embodiment of a calibration circuit.

In the drawings, like reference numerals designate similar parts.

DESCRIPTION OF EMBODIMENTS

Figure 1A:
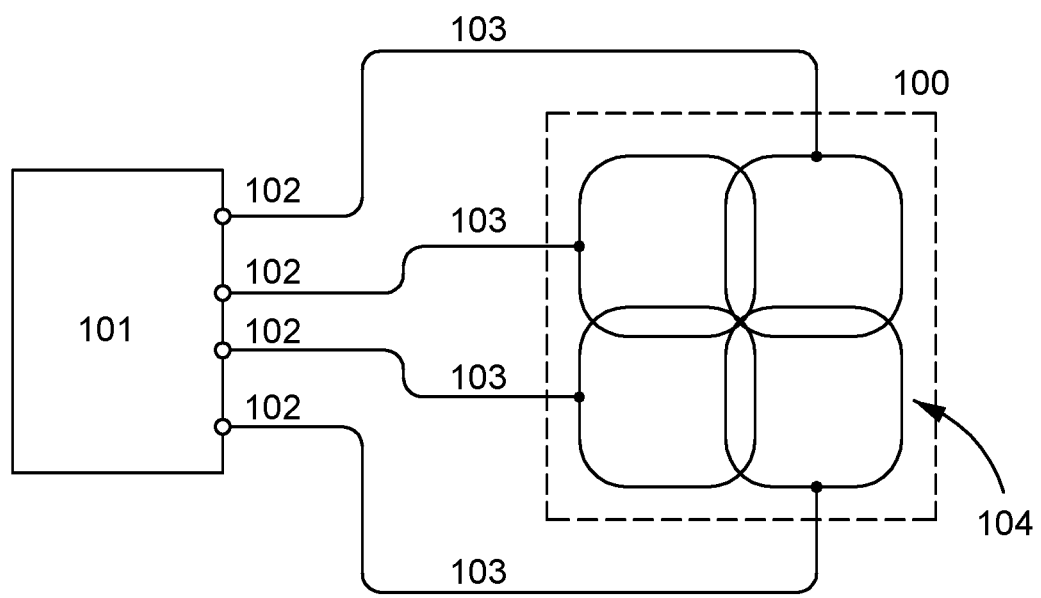
FIG. 1A is a schematic representation of a prior art RFID system.
Figure 1B:
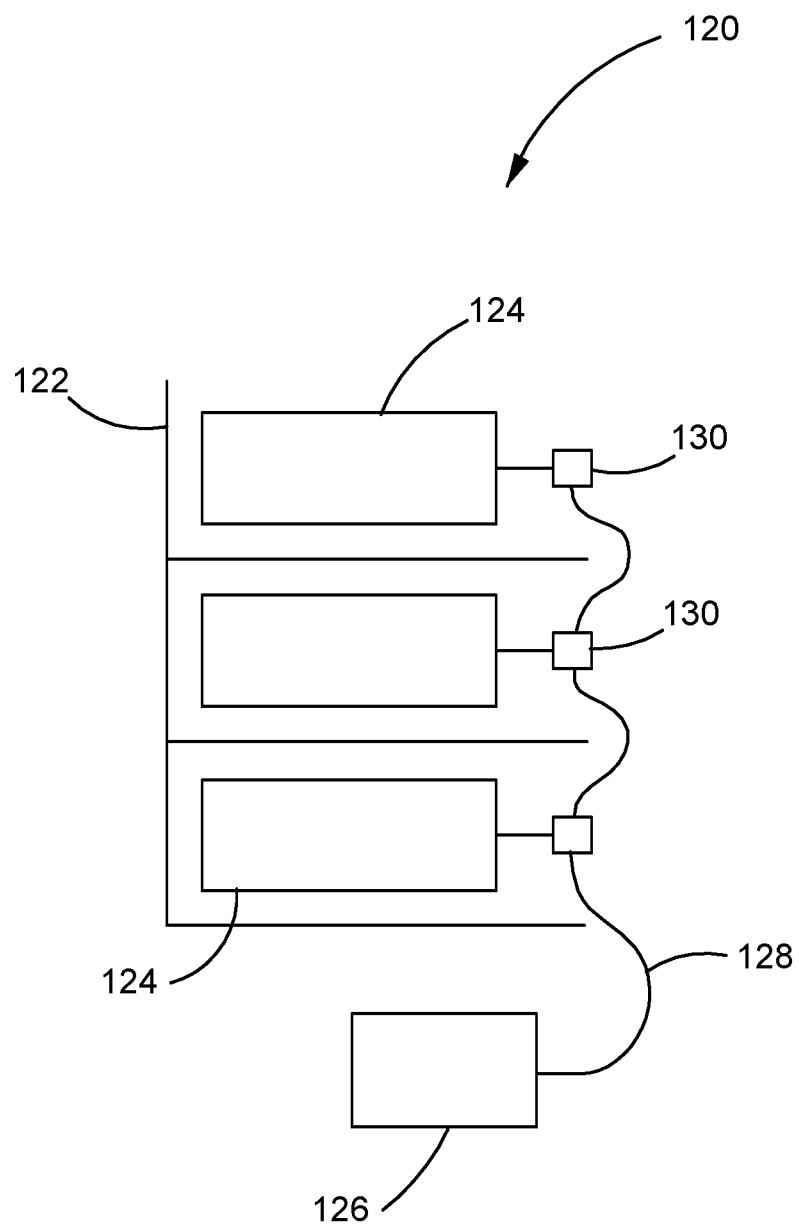
FIG. 1B is a schematic representation of another prior art RFID system.

FIG. 1B illustrates another prior art antenna configuration 120 that attempts to reduce the amount of cabling being used by using a serial configuration. The example illustrated in FIG. 1B is of a shelf 122 with three antennas 124 that are connected to a reader 126. A length of cable 128 and a bypass switch 130 connects each consecutive antenna 124 and connects to the reader 126. Typically, this type of configuration keeps all the antenna units powered by tapping off power at each shelf via the respective bypass switch 130. An individual antenna 124 is activated via a control mechanism that addresses the particular antenna 124 via a unique address. This approach can be inefficient not only in terms of power usage, but also due to the complexity of implementing an addressing system.

Typically, conventional RFID systems (such as those illustrated in FIGS. 1A and 1B) are configured to operate as impedance matched systems. The input impedance of the antennas 104, 124 would be matched to the cable 103, 128 which would be matched to the output impedance of the reader 101, 126. Matching is done to simplify design and to maximise power transfer in RF systems. However, in RFID systems, impedance matched systems suffer from narrow bandwidth operation and consequently low data rates. For RFID systems that use antenna coils the interrogation signal is an oscillating magnetic field. The interrogation field is reactive and maximum power transfer is not a useful measure of performance since the reactive interrogation field is lossless. Any circuit losses are due to resistive losses and do not constitute a useful part of the interrogation signal. Maximising the power transfer is equivalent to maximising the losses which is not useful for a reactive system. Because of this, the solution proposed herein is an RFID system that is not impedance matched.

Impedance Mismatched Operation

In an impedance mismatched RFID system the output impedance of the RFID reader is not matched to the impedance of the connecting cable, and the impedance of the connecting cable is not matched to the impedance of the RFID antenna. The benefits of this type of mismatching include wide bandwidth and high data rate operation.

Typically the connecting cable will be a coaxial cable with an impedance of Zo=50 ohms, however other types of cables may also be used. The antenna is typically a series tuned coil with a low impedance of a few ohms, for example 2 ohms to 5 ohms. When connected to the cable, the antenna 206 and cable are impedance mismatched. Likewise the reader output impedance will be low, typically 10 ohms, which is also mismatched to the cable impedance. The antenna impedance is transformed along the cable, and if the cable is a specific fixed and correct length, then the transformed impedance will be a predictable value. A drawback of a typical mismatched system is the requirement for the cable to have a specific fixed correct length. One option is to include additional lengths of cable per cable link to ensure that the specific length is provided, but this would result in bulky cabling. Accordingly it would be useful to find a way to provide reliable mismatched operation where the cable length is not the required defined length.

System Overview

Figure 2A:
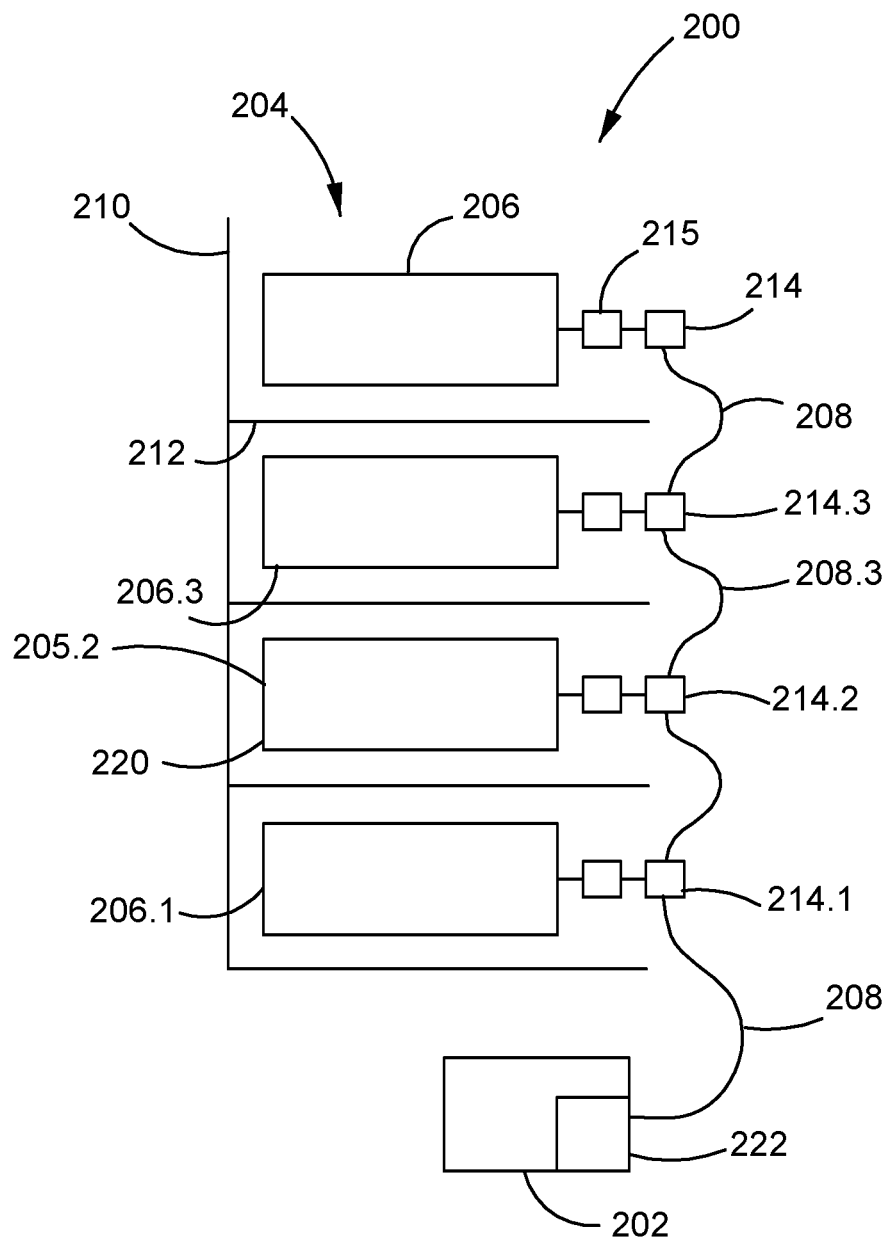
FIG. 2A is a schematic representation of an RFID system with serially connected antennas.

FIG. 2A of the drawings illustrates an RFID system 200 that has multiple antennas, for example as implemented in a cabinet 210 having several shelves 212. The RFID system 200 has an RFID reader 202 and a controller 222. In some embodiments the RFID reader 202 powers the controller 222, and in some embodiments the controller 222 forms part of the reader 202.

In some embodiments, the RFID system 200 has an RFID reader 202 configured to interrogate RFID antennas, and the system 200 has an antenna array 204 that has two or more RFID antennas 206 connectable to the RFID reader 202 via a series of cable links 208, each RFID antenna 206 associated with a respective cable link 208. Each cable link 208 has a certain cable length. The system 200 also has a length compensation unit 215 associated with each RFID antenna 206, and the length compensation unit 215 is configured to adjust a total cable length between the RFID reader 202 and its respective RFID antenna 206 to be an effective cable length. The system 200 has a bypass switch 214 associated with each RFID antenna 206, each bypass switch 214 operable to either bypass the respective RFID antenna or connect the respective RFID antenna to the RFID reader 202. In some embodiments the bypass switch 214 and the length compensation unit 215 form a combined unit with shared functionality, for example having a shared local controller.

In this way, the antennas 206 are connected in series, in a daisy chain arrangement, each RFID antenna 206 connected to the RFID reader 202 via a respective cable link 208 and via a respective length compensation unit 215. In the system 200 the cable length to each antenna 206 becomes increasingly longer and does not have a single fixed length as required for typical impedance mismatched operation. This variable total cable length is accommodated by including the length compensation units 215. By effectively adding or subtracting cable length, a length compensation unit 215 is able to ensure that the effective cable length is substantially equal to the defined cable length required for impedance mismatched operation.

Each RFID antenna 206 has an antenna impedance ZA, and each antenna's respective cable link 208 has a cable impedance Zo. The antenna impedance ZA is different to the cable impedance Zo so that the RFID antenna and its respective cable link are impedance mismatched. The length compensation unit 215 associated with an RFID antenna 206 is configured to adjust for the total cable length between the RFID reader and the respective RFID antenna so that reflection resulting from the impedance mismatch between the RFID antenna and the cable link is controlled to have a predefined phase. The phase of the reflection affects the impact that the reflection has on the operation of the reader and antenna, and the correct value of the phase when it arrives at the reader end will ensure that the impedance transformation is correct.

In this way, the system of FIG. 2A is configured for mismatched operation and the length compensation unit 215 makes the necessary electrical length adjustments required to provide reliable mismatched operation where the cable length is not of a fixed correct length.

Length Compensation

In order for the reader 202 to see the appropriate defined cable length, the length compensation unit 215 is configured so that the necessary electrical length adjustments are made to provide reliable mismatched operation where the cable length is not of a fixed correct length. The length compensation device is chosen to appear electrically as an extra length of cable where the cable is too short, or as a 'negative' length of cable where the cable is too long.

Figure 3A:
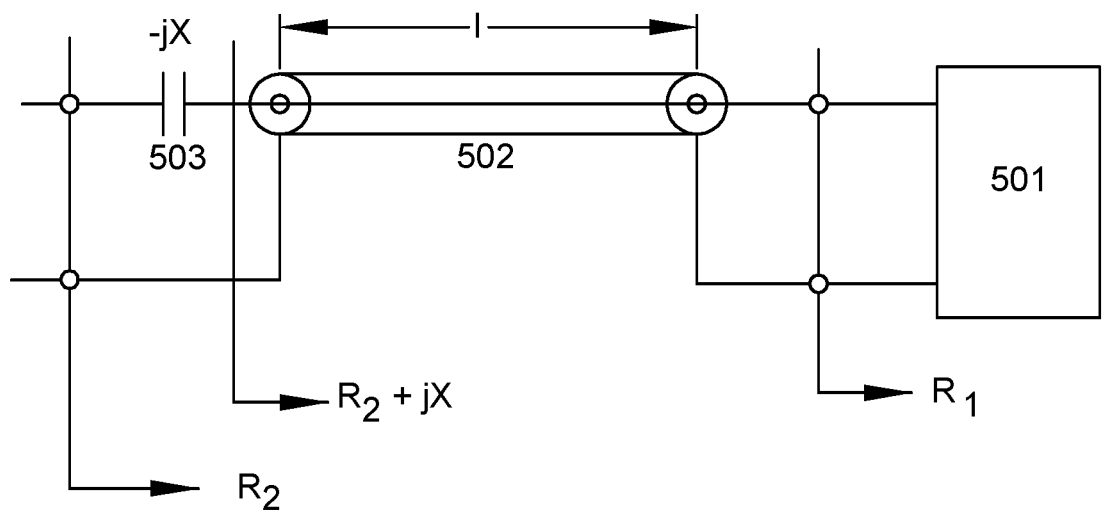
FIG. 3A is a schematic representation of a circuit with a mismatched antenna and cable configuration.

FIG. 3A of the drawings illustrates an embodiment where the impedance of an antenna 501 Z1 is given by R1. The impedance of the antenna 501 is not matched to the impedance Zo of the cable 502. The impedance Z1 is transformed down the length of the cable to a value of Z2, which is given by R2+jX at the far end of the cable. The total impedance as seen by a reader is adjusted by compensation element 503 with impedance −jX so that the total impedance Z3, as seen by the reader, is equal to R2.

Figure 3B:
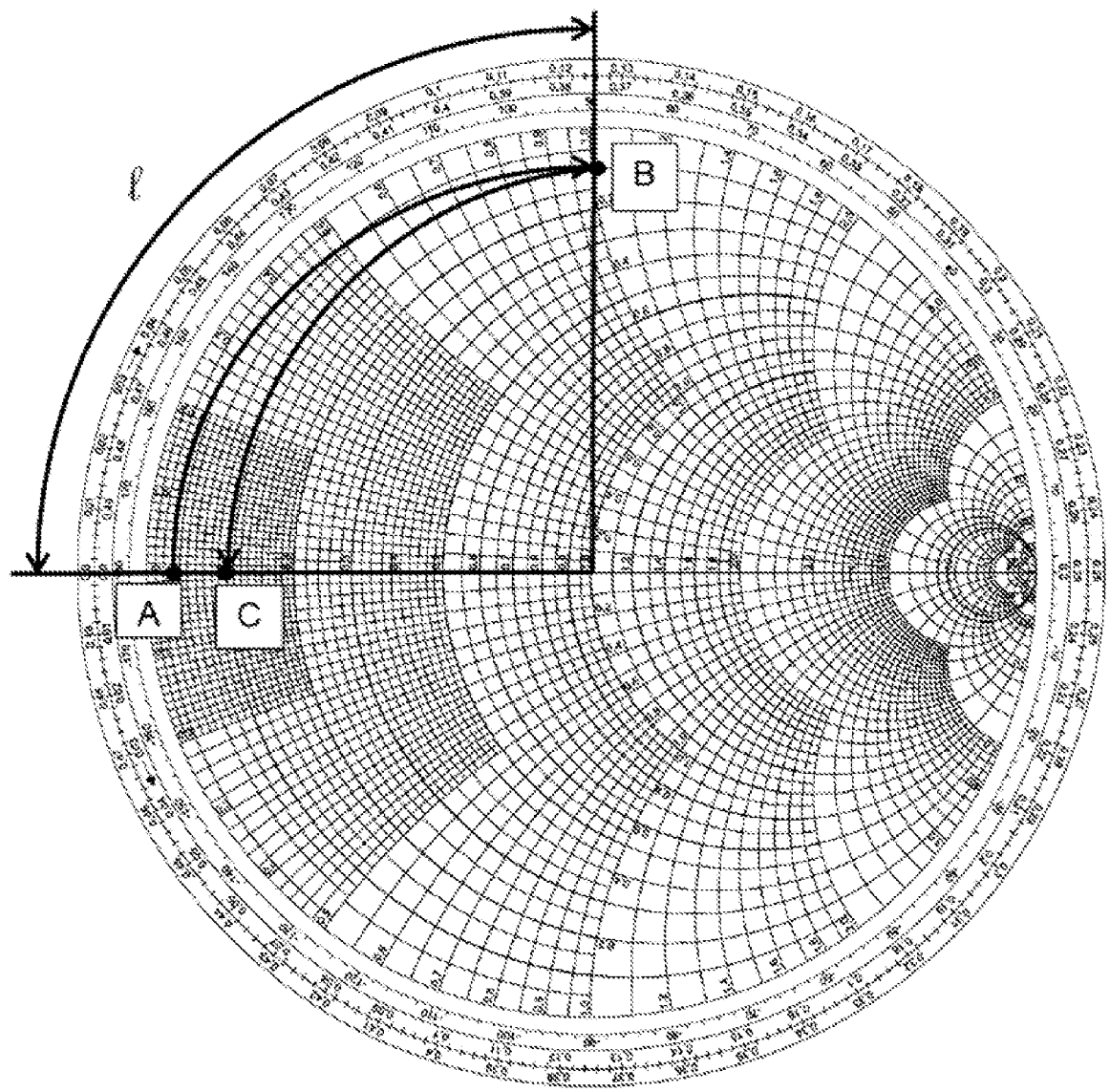
FIG. 3B is a Smith Chart illustrating the impedance of the circuit of FIG. 3A.

FIG. 3B shows a Smith Chart 300 that illustrates the changes in impedance from the antenna (point A), through the cable (point B) and including the compensation element 503 (point C).

A: Z1=R1
B: Z2=R2+jX
C: Z3=R2

Figure 4A:
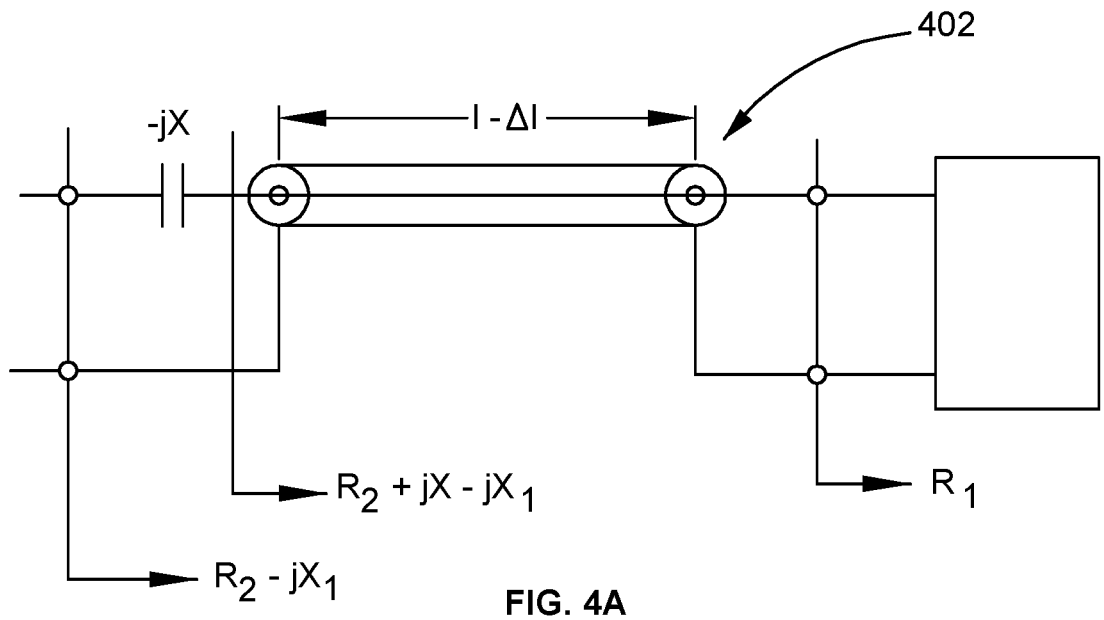
FIG. 4A is a schematic representation of the impedance in a circuit with a reduced length cable.
Figure 4B:
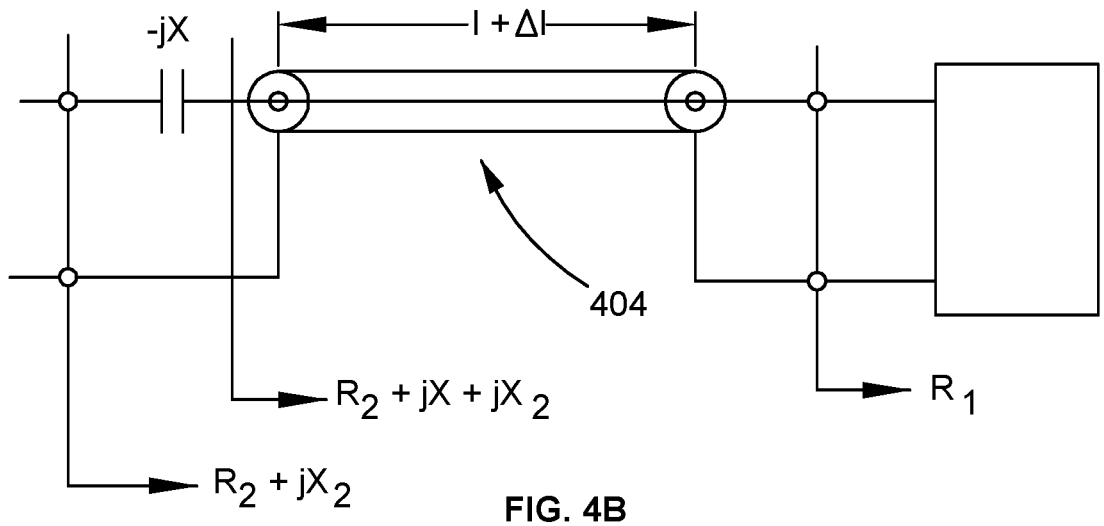
FIG. 4B is a schematic representation of the impedance in a circuit with an increased length cable.

The embodiment illustrated in FIGS. 3A and 3B is dependent on a defined cable length l, which is typically a relatively short length of 1.5 meters which is less than ⅛ of a wavelength. Where the cable length deviates, the impedance seen by the reader is not optimal for reader performance. For example, as illustrated in FIG. 4A, a shorter cable 402 would result in a load impedance Z3 of R2−jX1, and as illustrated in FIG. 4B, a longer cable 404 would result in a load impedance Z3 of R2+jX2.

As different antennas 206 in the antenna array 204 are selected, the characteristics of the connecting cabling change because a varying cable length is included from the reader 202 to the antenna selected to be the active antenna. For example, the total cable length will be different when a first antenna 206.1 is connected to the reader 202 via the first bypass switch 214.1, when compared to the total cable length when a third antenna 206.3 is connected to the reader 202 via the third bypass switch 214.3.

The RFID reader 202 is configured to operate with a predefined load impedance ZL. Therefore, as different antennas 206 in the antenna array 204 are selected, the total impedance seen by the reader 202 will change due to the changing total cable length. In order to adjust the total impedance seen by the reader 202 to be substantially equal or close to the predefined load impedance ZL, the length compensation unit 215 included in the connection between the reader 202 and the active antenna 220 provides a length compensation that causes the total impedance as seen by the reader 202 to be substantially equal to the predefined load impedance ZL. In this way, the same effective cable length is seen from the reader 202 irrespective of which antenna is activated.

Ideally, the RFID antenna has an antenna impedance that has a resistance but no reactance. For mismatched operation, it is also preferable that this antenna resistance is transformed along the connecting cables to a transformed impedance that has a resistance and not a reactance, in other words with zero phase. However, as shown in FIG. 4B, when the connecting cable is too long or too short, the transformed impedance includes a reactance.

Figure 5A:
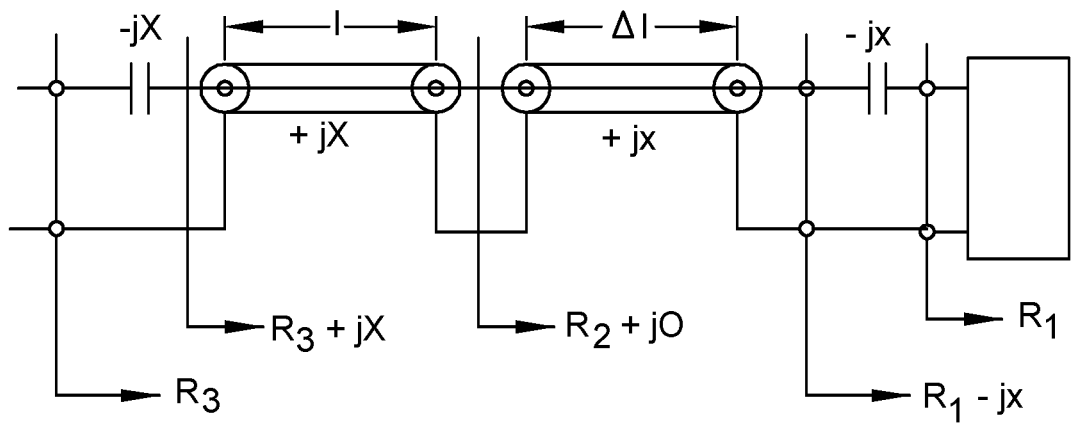
FIG. 5A is a schematic representation of a circuit with length compensation for an increased length cable.
Figure 5B:
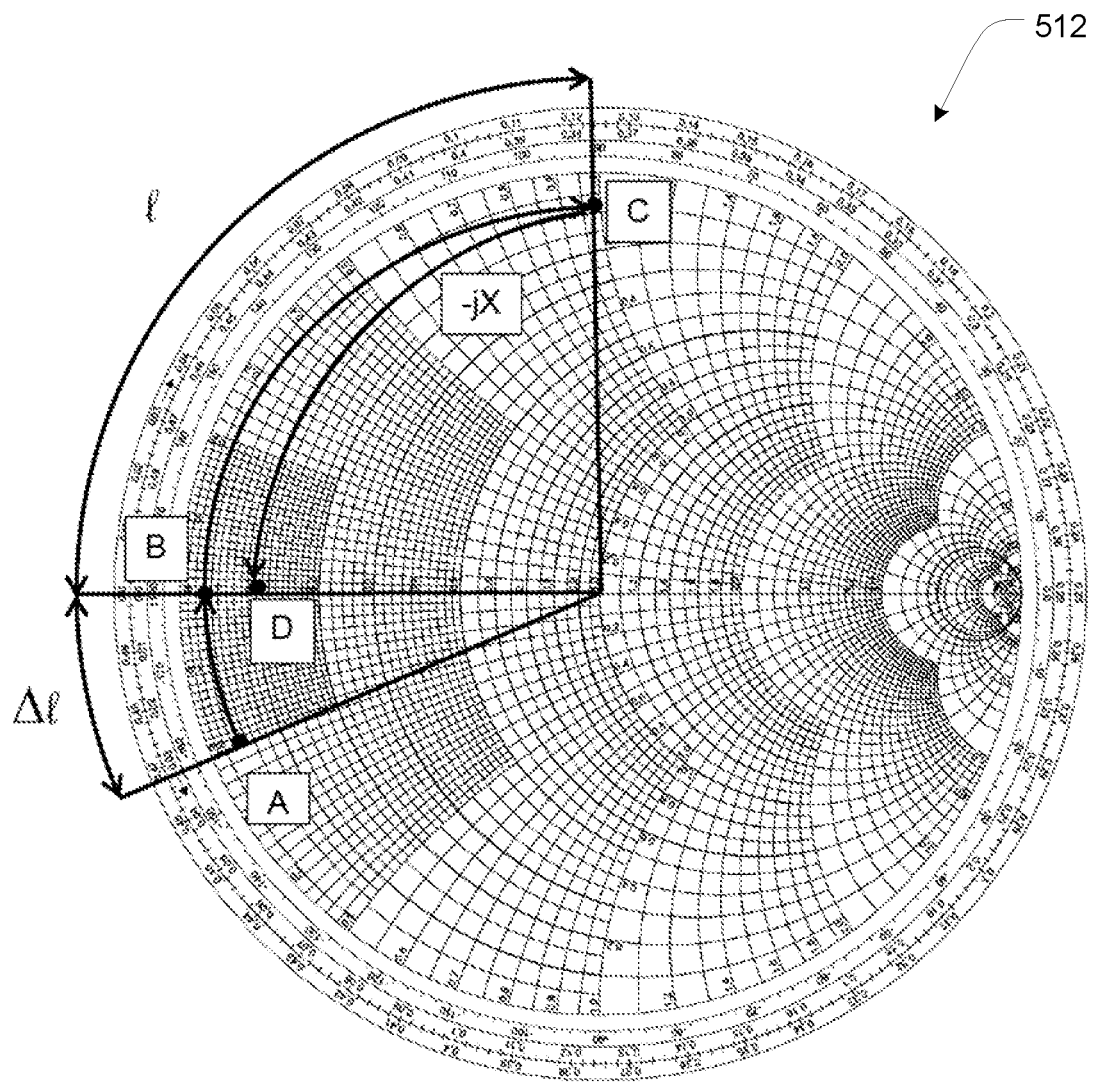
FIG. 5B is the Smith Chart illustrating the impedances along the circuit of FIG. 5A.

In some embodiments, the compensation units compensate for an increase in total cable length using a passive element configuration 510 as illustrated in FIG. 5A. The impedance of the circuit shown in FIG. 5A is illustrated in the Smith Chart 512 of FIG. 5B where the impedance changes are:

At A, including −jΔX compensation impedance: Z1=R1−jΔX;
At B where the additional Δl has been compensated for: Z2=R2;
At C following the defined cable length l: Z3=R3+jX; and
At D including a default pre-compensation −jX: Z4=R3.

Figure 6A:
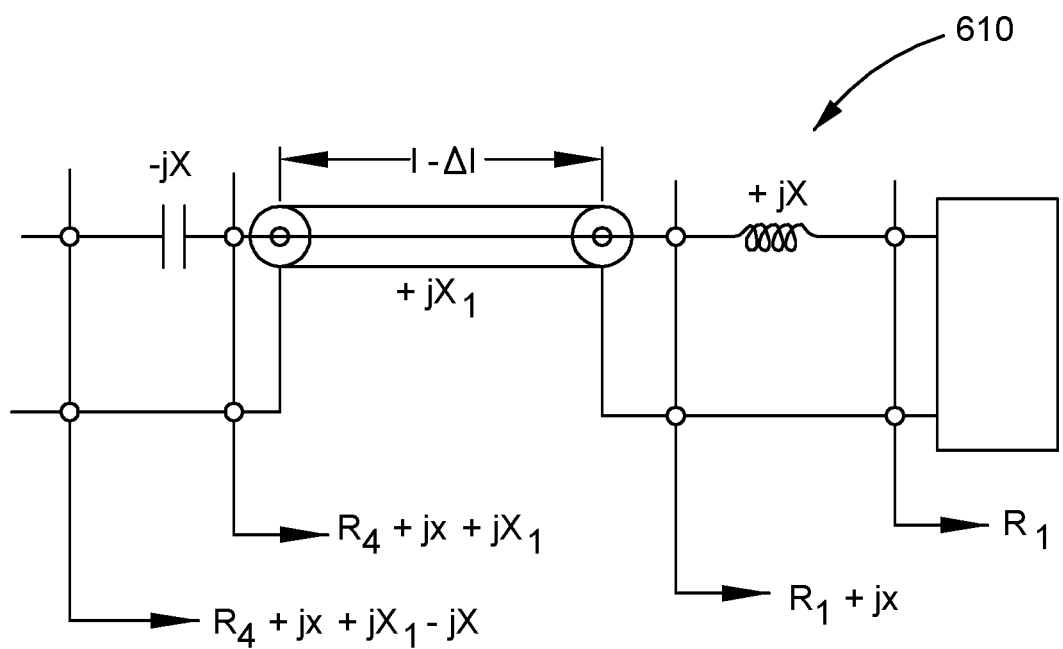
FIG. 6A is a schematic representation of a circuit with length compensation for a reduced length cable.
Figure 6B:
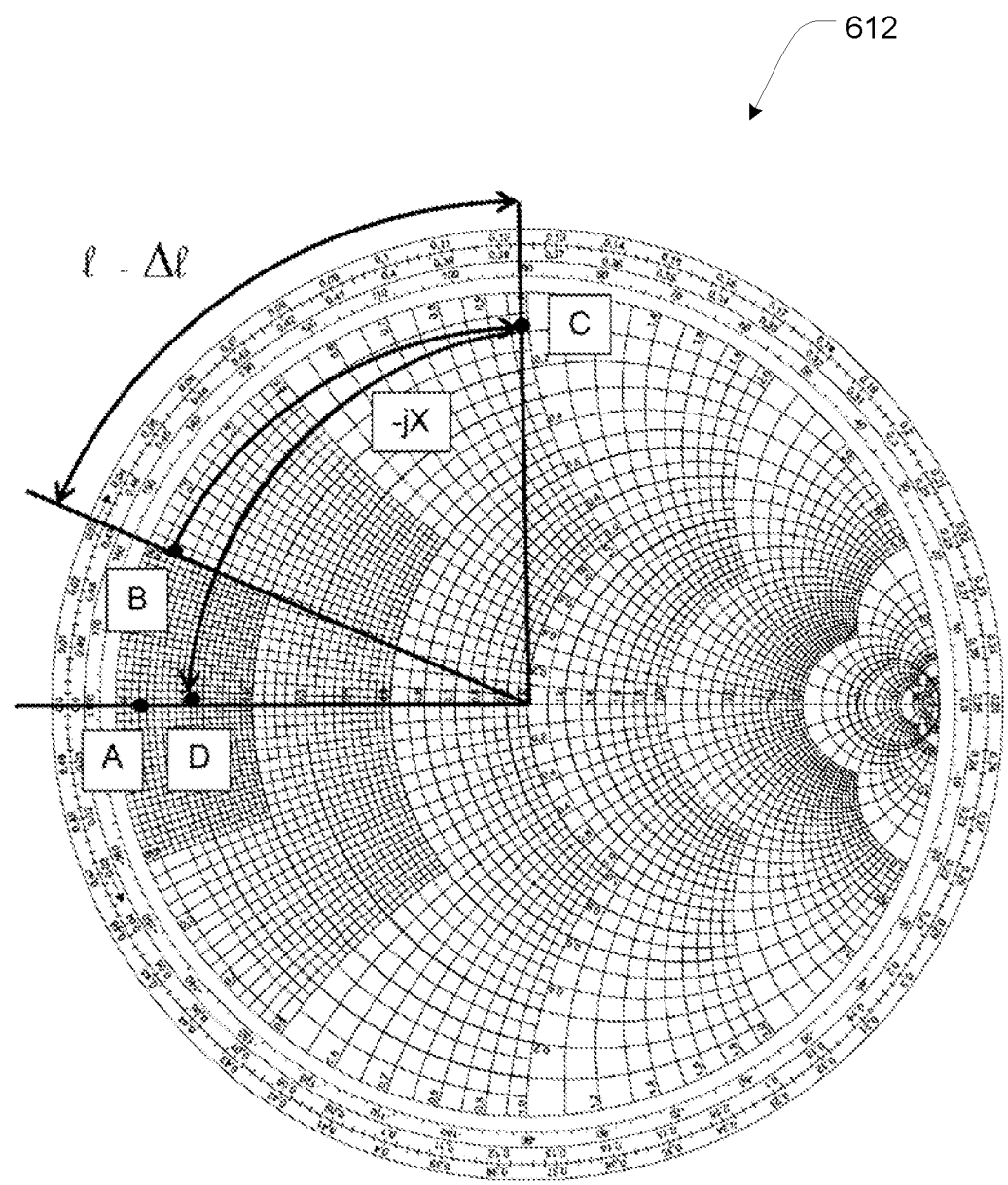
FIG. 6B is the Smith Chart illustrating the impedances along the circuit of FIG. 6A.

In some embodiments, the compensation units compensate for a decrease in total cable length using a passive element configuration 610 as illustrated in FIG. 6A. The impedance of the circuit shown in FIG. 6A is illustrated in the Smith Chart 612 of FIG. 6B where the impedance changes are:

At A: Z1=R1;
At B, including jΔX compensation impedance: Z2=R1+jΔX;
At C following a reduced cable length: Z3=R4+jX; and
At D including a default pre-compensation −jX: Z4=R4.

Figure 7:
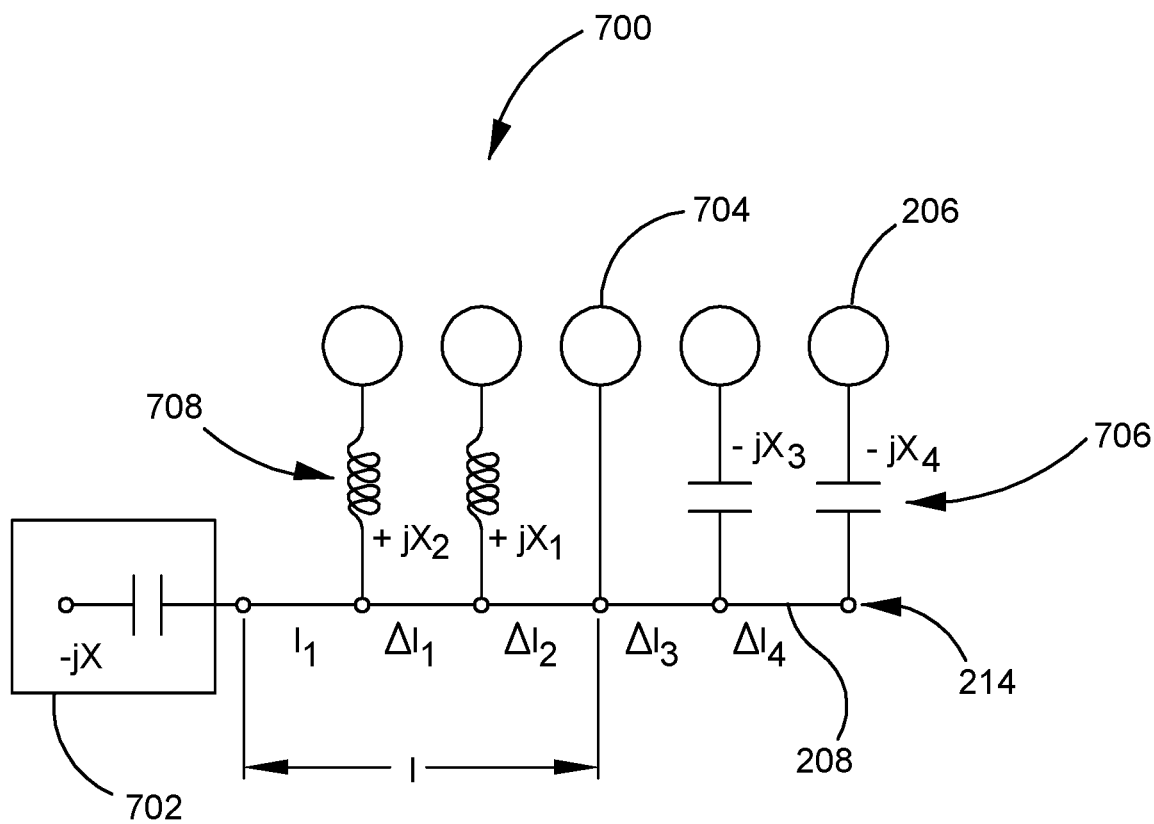
FIG. 7 is a schematic representation of an embodiment of an embodiment of a length compensation unit.

It will be understood that various different configurations of capacitive and/or inductive elements may be used for a set of compensation units 215 associated with an array 204 of antennas 206 as shown in FIG. 2A. In one embodiment 700, illustrated in FIG. 7 of the drawings, five antennas 206 are connected in series via cable links 208. The total cable length l from the reader to a selected active antenna is equal to the sum of an initial cable length l1 and the cable lengths up to the active antenna 220, $n \times \Delta l_n$.

In this embodiment, the default compensation length is considered to be:

$$l = l1 + \Delta l1 + \Delta l2,$$

with the shorter connecting cables of the first two antennas requiring additional compensation lengths of $\Delta l1+\Delta l2$ and $\Delta l2$ respectively, and the longer connecting cables of the last two antennas requiring a reduction in length with compensation lengths of $-\Delta l3$ and $-\Delta l3-\Delta l4$ respectively.

To do this, a configuration of compensation units is used that provides a default compensation 702 of $-jX$ associated with a middle antenna 704, and capacitive 706 and inductive 708 compensation units positioned further and closer than the middle antenna 704, respectively, to the reader with reactance as follows:

$$-jX \equiv \ell = \ell_i + \Delta \ell_1 + \Delta \ell_2$$

$$+jX_1 = \Delta \ell_2$$

$$+jX_2 = \Delta \ell_1 + \Delta \ell_2$$

$$-jX_2 = -\Delta \ell_3$$

$$-jX_4 = -\Delta \ell_3 - \Delta \ell_4$$

In this way, the length compensation units include a configuration of reactive electronic components that emulate a lengthening or shortening of the total cable length, as required.

Bypass Switching

The controller 222 activates one RFID antenna 206 at a time by communicating a bypass control signal to the antenna array 204. The controller 222 controls switching between the antennas 206 by controlling the bypass switches 214. The bypass switches are responsive to the bypass control signal so as to either bypass the respective RFID antenna or connect the respective RFID antenna to the RFID reader.

In some embodiments a 3-bit control line may be provided, for example, enabling switching between the antennas at each daisy chain position. In other embodiments a combined RF, DC and control signal is transmitted from the controller 222 along the daisy chain cable towards the antenna array 204, and this bypass control signal causes the selected bypass switch 214 to switch in the selected length compensation unit 215 together with a selected antenna 220. In some embodiments the control signal is carried on the RF signal and/or the DC power signal according to the methods described in the International Patent Application published as WO2009/149506 A1, the contents of which are incorporated herein by reference. In some embodiments the control signal is imposed on a DC power signal that also provides power to a local unit controller 1102 that controls the bypass switch 214. This is described in more detail elsewhere herein with reference to FIG. 12. In some embodiments, the control signal from the controller 222 may direct the operation of a local antenna controller 1310 as described elsewhere herein with reference to FIG. 13. It will be understood that communication between the RFID reader 202 and the antennas 206 are bidirectional, for example via one or more of the controllers 222, 1102, 1310.

Figure 2B:
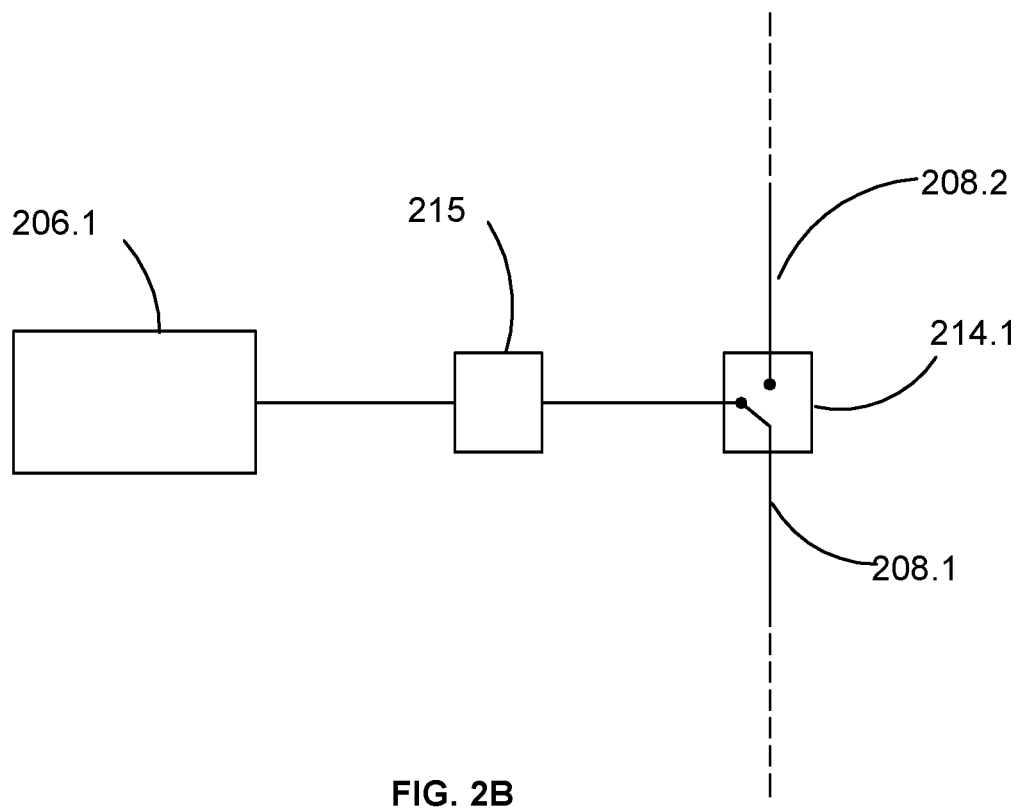
FIG. 2B is a schematic representation of a bypass switch used in the RFID system of FIG. 2A.
Figure 2C:
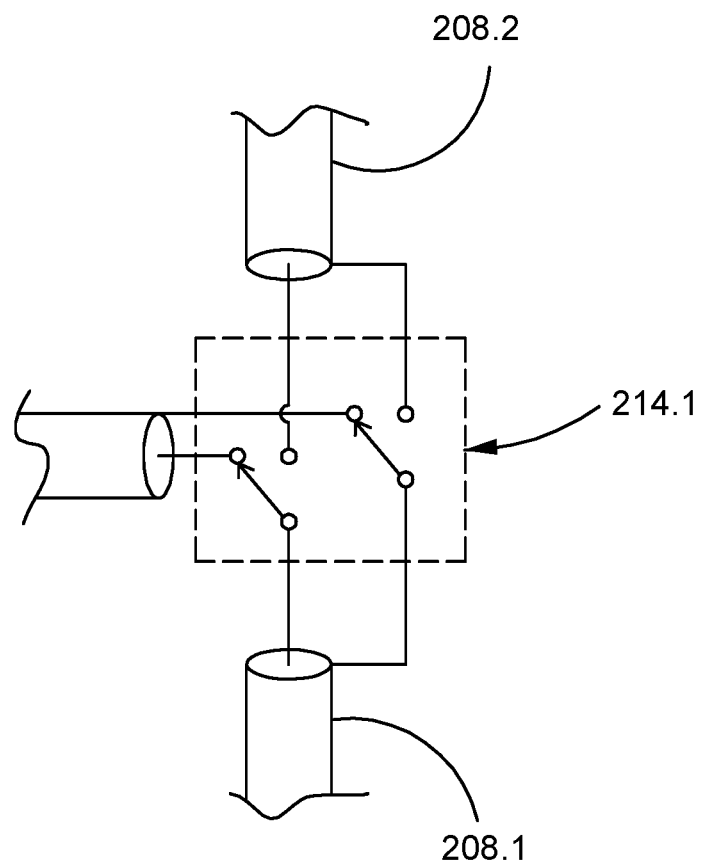
FIG. 2C is another schematic representation of the bypass switch used in the RFID system of FIG. 2A.

The connection from the RFID reader 202 to an antenna 206, or alternatively past an antenna 206 and to the following cable 208 is made via a bypass switch 214. FIGS. 2B and 2C of the drawings show, as an example, the first bypass switch 214.1 of the system 200 illustrated in FIG. 2A. Switch 214.1 can either connect cable 208.1 to the first antenna 206.1 via length compensation unit 215.1, or bypass antenna 206.1 and connect cable 208.1 to cable 208.2 that leads to the second antenna 206.2. In the illustrated example, the second antenna 206.2 has been selected to be the active antenna 220. Each bypass switch 214 operates to connect a selected active antenna 220 to the cable 208 from the reader 202 while at the same time disconnecting the next piece of cable 208 following the switch 214. So in this example, switch 214.2 disconnects cable 208.3. Alternatively, when the bypass switch 214 is set to bypass an antenna 206, then the switch 214 disconnects its respective antenna and connects the preceding and subsequence cable links 208 so that the reader 202 can connect to the next antenna along the daisy chain. In this example, switch 214.1 will switch to bypass antenna 206.1 and to connect cables 208.1 and 208.2.

In some embodiments the bypass switches may be implemented using pin diodes. In other embodiments the bypass switches may be implemented using relays.

Adjustable Compensation

In some embodiments the controller 222 controls the compensation units 215 where the compensation length of each length compensation unit is adjustable.

FIG. 8-FIG. 12 illustrate embodiments of adjustable length compensation units.

Figure 8:
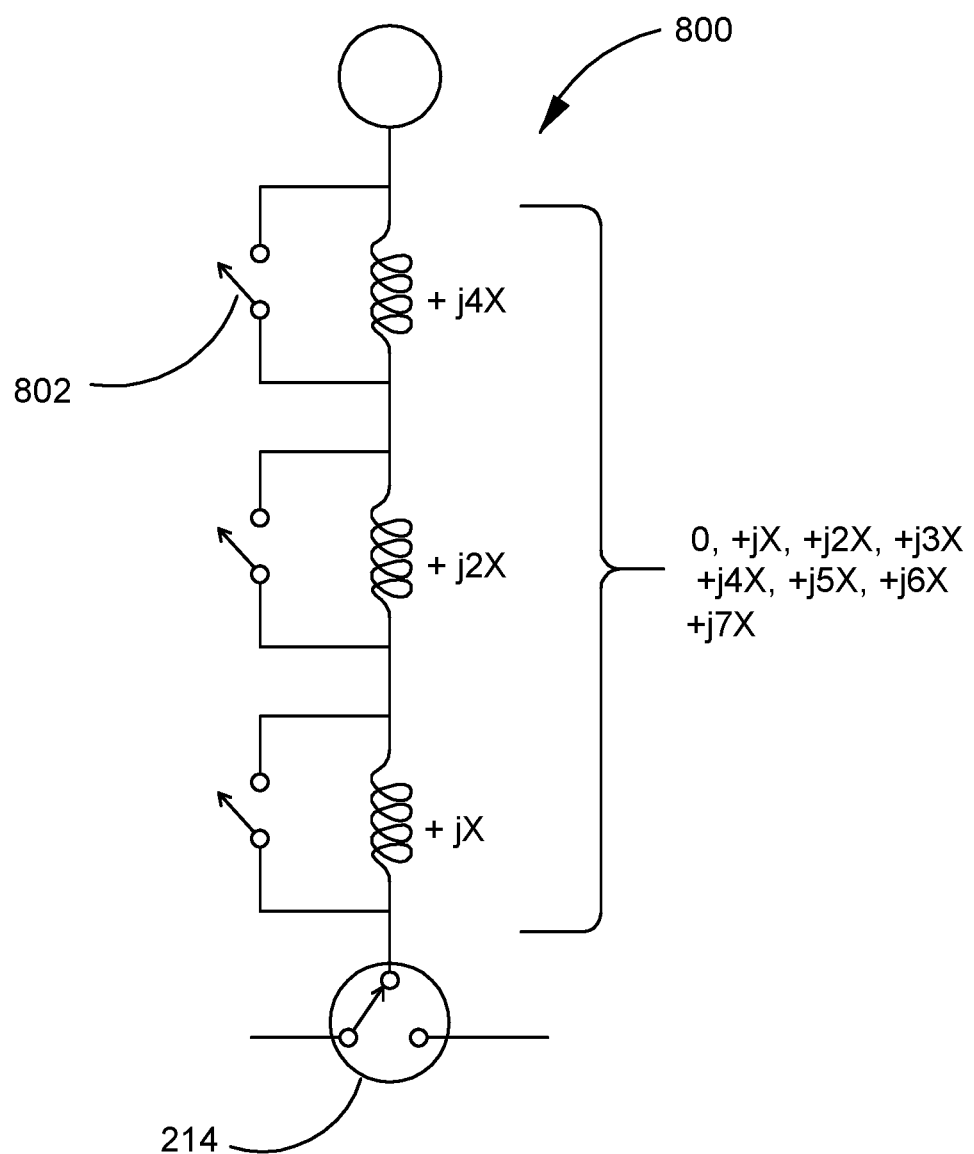
FIG. 8 is a schematic representation of an embodiment of a length compensation unit.

The length compensation can be made adjustable by making the impedance value selectable using switches, as shown in FIG. 8 which illustrates a first embodiment of an adjustable length compensation configuration 800. The length compensation illustrated has binary weight inductive impedance each selectable using shunt switches 802. The inductive impedance can be adjusted from zero to $+j7X$ in steps of $jX$.

Figure 9:
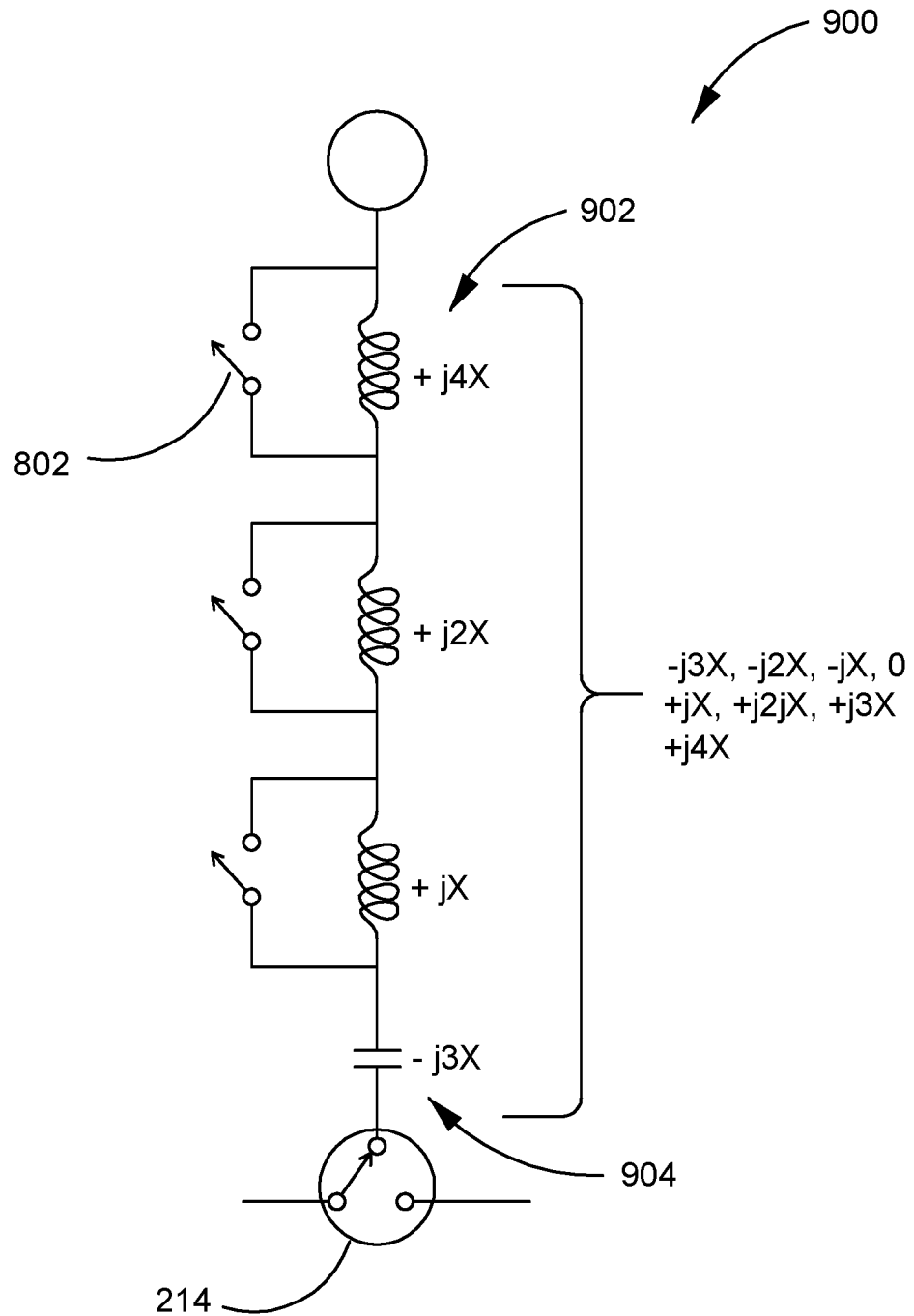
FIG. 9 is a schematic representation of another embodiment of a length compensation unit.

FIG. 9 shows a second embodiment of an adjustable length compensation configuration 900 where the adjustment can be made in a positive and a negative direction with inductance 902 and capacitance 904 respectively. The binary weight inductive impedances are each selectable using shunt switches 802 and the total series impedance can be adjusted from $-j3X$ to $+j4X$ in steps of $jX$.

Figure 10:
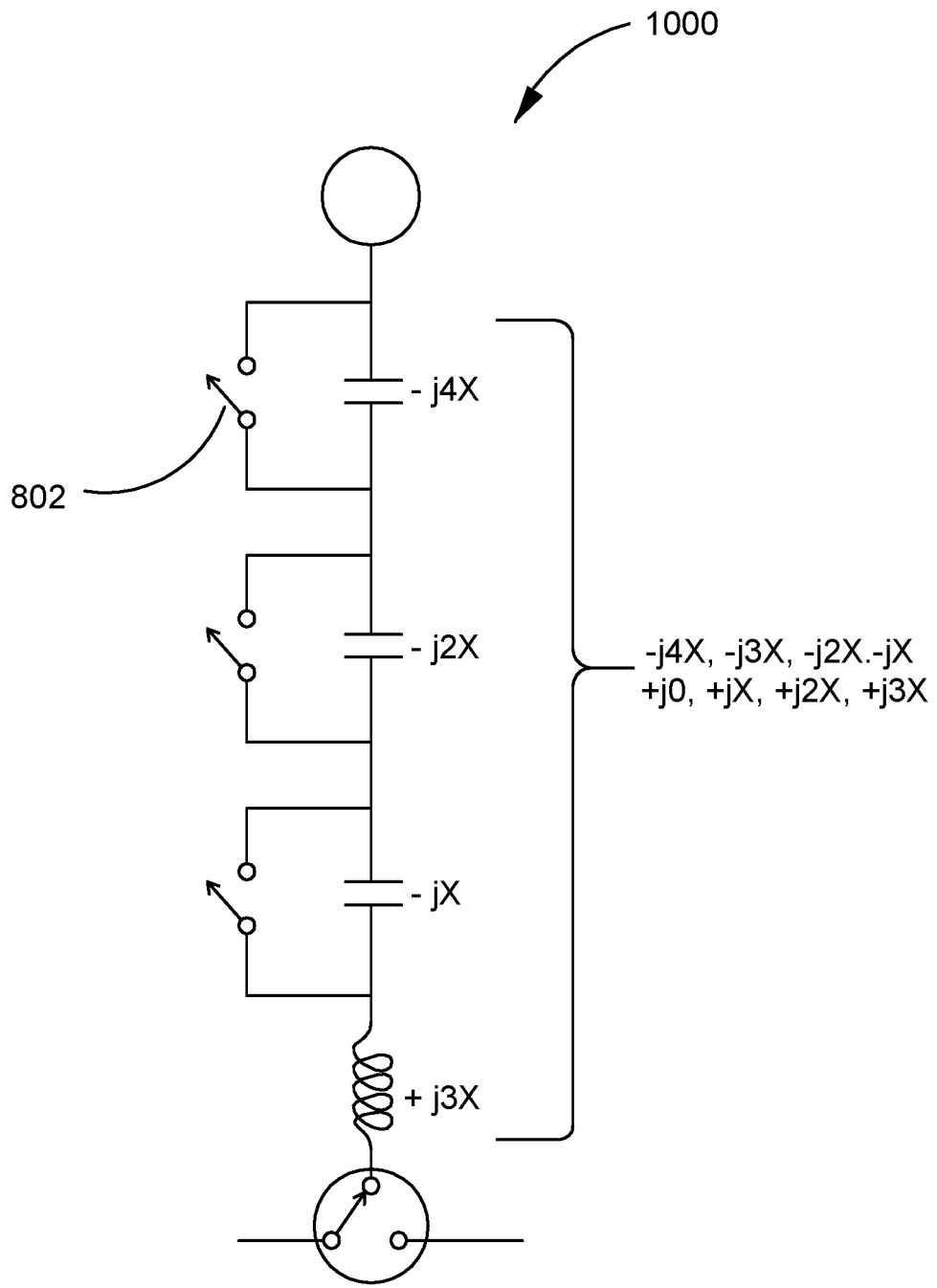
FIG. 10 is a schematic representation of yet another embodiment of a length compensation unit.

FIG. 10 shows a third embodiment of an adjustable length compensation configuration 1000 where the adjustment can be made in a positive and a negative direction, with an alternative combination of inductance and capacitance. The binary weight capacitive impedances are each selectable using a shunt switch 802 and the total series impedance can be adjusted from $-j4X$ to $+j3X$ in steps of $jX$.

In some embodiments the shunt switches 802 may be implemented using pin diodes. In other embodiments the shunt switches 802 may be implemented using mechanical switches that are manually set. In other embodiments the shunt switches 802 may be implemented using relays. It is possible to use mechanical latched relays in applications where switching is infrequent so that relays can be latched and stay set. This is the case in applications where adjustments are made at power up, and thereafter only infrequently as particular antennas in the array are selected, and where the configurations are preferably saved on power down.

Figure 11:
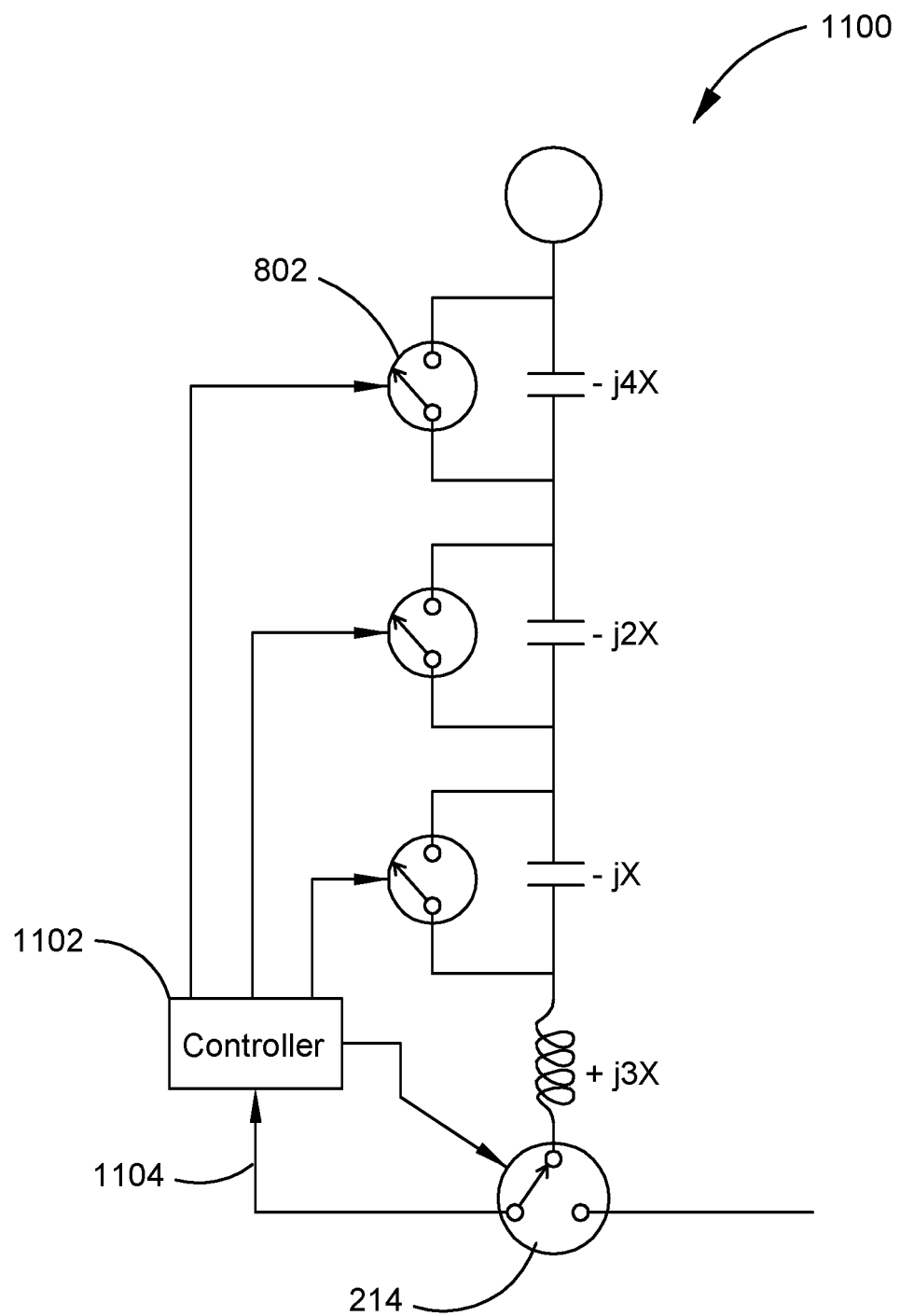
FIG. 11 is a schematic representation of an embodiment of a length compensation unit having a local unit controller.

FIG. 11 shows another embodiment of a length compensation unit 1100 where a combination RF, DC and control signal is transmitted from the reader 202 along the daisy chain cable towards the antenna array 204, and the control signal causes the selected bypass switch 214 to switch in the selected length compensation unit 215. The control signals are imposed on a DC power signal. The DC power signal provides power to a local unit controller 1102 that operates the bypass switch 214. The control signal 1104 also directs the operation of the unit controller 1102 to control the shunt switches 802 of the length compensation unit 1100. In this way the unit controller 1102 can adjust the length compensation (under the direction of the reader's controller 222) to ensure that the correct length compensation is selected for the active antenna.

Figure 12:
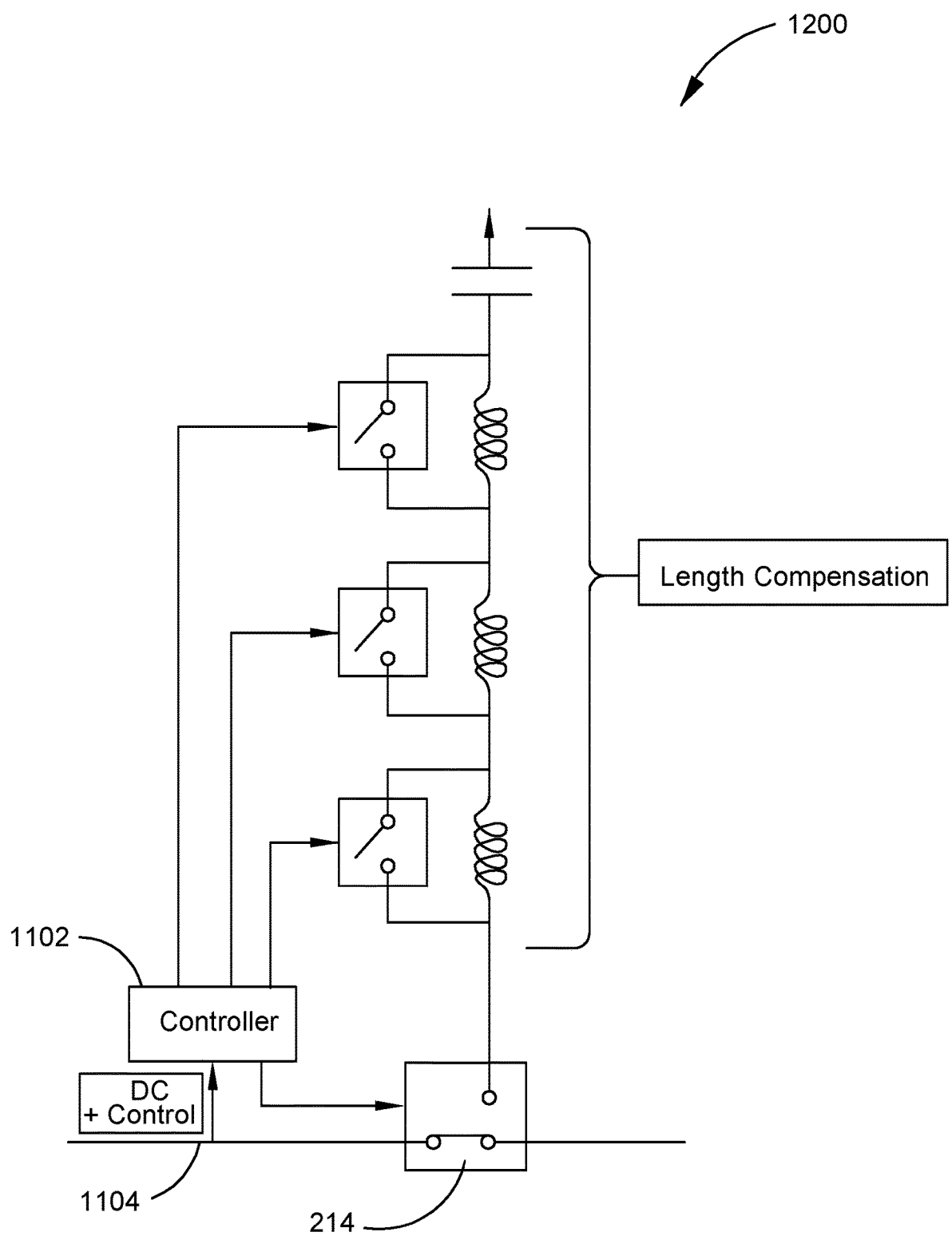
FIG. 12 is a schematic representation of another embodiment of a length compensation unit having a local unit controller.

FIG. 12 illustrates yet another embodiment of a length compensation unit 1200 using the same combination RF, DC and control signal 1104 as described with reference to FIG. 11. As illustrated here, when the reader 202 deselects an antenna 206 the bypass switch 214 disconnects the length compensation unit 1200, however the unit controller 1102 remains active and is able to hold the switch 214 in the 'bypass' state so that the reader 202 can communicate with the next antenna's unit controller. The process is repeated for the following antenna and so on. In this way the reader 202 is able to communicate with every antenna 206 in the daisy chain in a sequential and repeatable manner. If power is disconnected than all bypass switches 214 revert to the open state which automatically places the reader 202 in connection with the first antenna 206.1 in the daisy chain due to the default setup of the first switch 214.1. The process of sequential control and operation can then be repeated.

While FIGS. 8-12 show 3 shunt switches per configuration, requiring 3 bits of control, a greater or lesser number of shunt switches may be used depending upon the length compensation resolution required.

Local Controller

Figure 13:
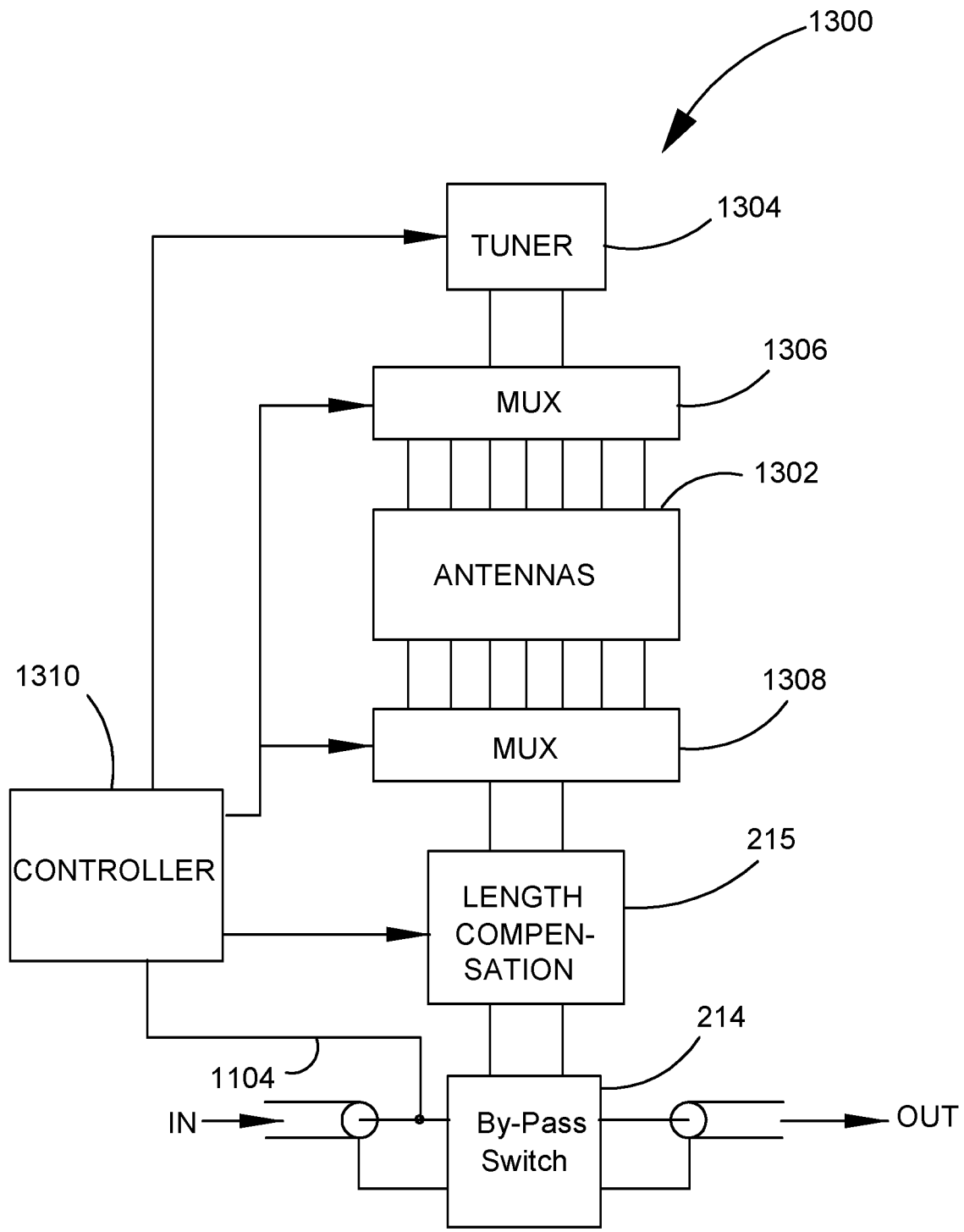
FIG. 13 is a schematic representation of an embodiment of an RFID subsystem.
Figure 14:
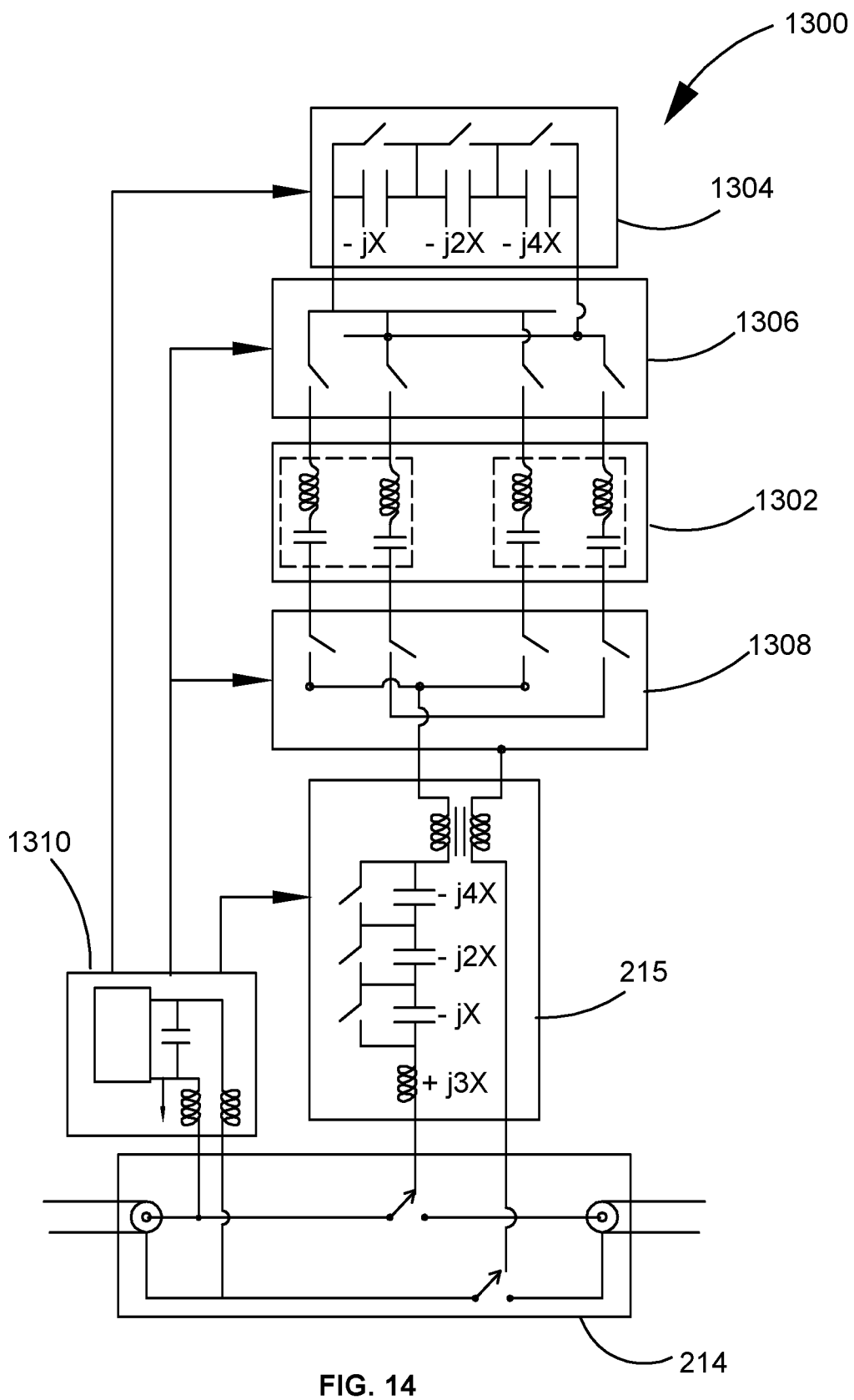
FIG. 14 is another schematic representation of the RFID subsystem of FIG. 13.

In FIGS. 13 and 14 of the drawings, an embodiment of an antenna subsystem 1300 is illustrated. The subsystem may, for example, be associated with one of the shelves 212 in the cabinet 210 illustrated in FIG. 2A.

The subsystem 1300 has a plurality of antennas 1302 in communication with a tuner 1304 via a first multiplexer 1306, and in communication with the length compensation unit 215 and bypass switch 214 via a second multiplexer 1308. The subsystem 1300 has a local antenna controller 1310 that controls the operation of the tuner 1304, the multiplexers 1306, 1308, the antennas 1302 via the multiplexers 1306, 1308, the length compensation unit 215, and the bypass switch 214 (for example, via the length compensation unit 215).

As in the embodiments illustrated in FIGS. 11 and 12, the subsystem may receive a combination RF, DC and control signal 1104 and when the reader 202 deselects an antenna 206 the bypass switch 214 disconnects the length compensation unit 215 while the antenna controller 1310 remains active and is able to hold the switch 214 in the 'bypass' state so that the reader 202 can communicate with the next antenna's controller.

The tuner 1304 adjusts the resonant frequency of the antenna coils by adjusting the tuning capacitance such that the antenna coil is tuned to be resonant. When tuned, the antenna input impedance has a real value that is low, since the preferred antenna is a series resonant coil with low resistance and no reactance.

In some embodiments, the subsystem 1300 may be operatively connected to one or more additional devices, displays, sensors, indicators, etc., for example to provide a user interface for the shelf 212 and/or cabinet 210. Indicator lights may show where a tag is located, a display may show picking information relevant to the shelf 212, etc.

Calibration

Prior to operation, for example at installation of the RFID system 200 or when the system is powered up, an initial effective cable length must be measured to ascertain any adjustment to the cable length compensation required.

Figure 15:
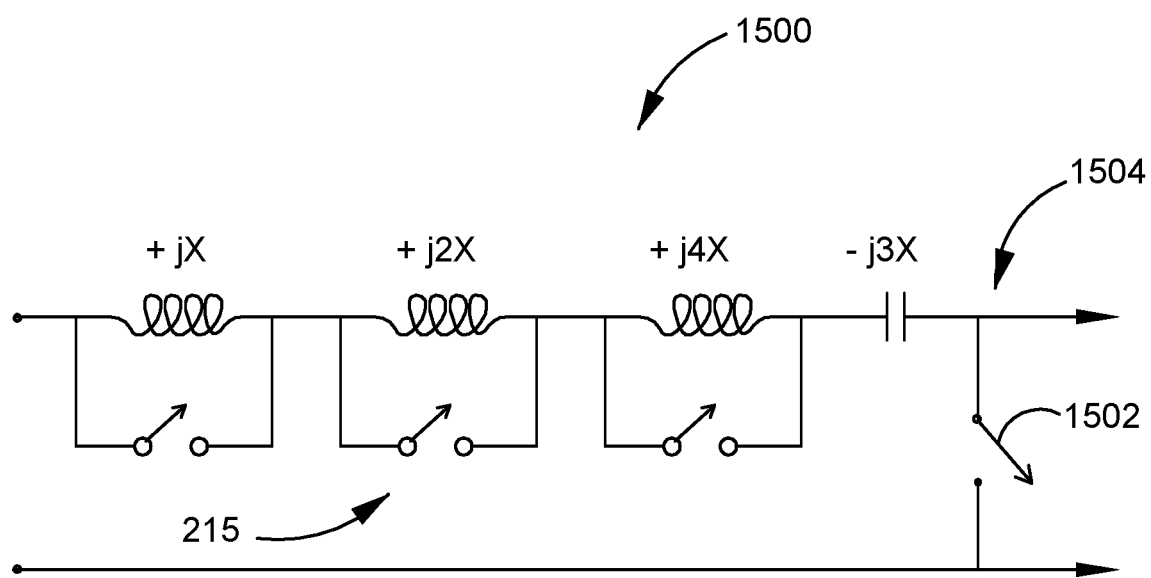
FIG. 15 is a schematic representation of an embodiment of a calibration circuit.

FIG. 15 shows a first embodiment of a calibration circuit 1500, and FIG. 16 shows a second embodiment of a calibration circuit 1600. Placing a shorting calibration switch 1502 at the antenna end 1504 of a length compensator 215 allows the reader 202 to set or calibrate the compensation length. The calibration switch 1502 is closed under the direction of the reader's controller 222 via a local controller, e.g. an antenna controller 1310. Once closed, the reader 202 can monitor the phase and amplitude of the RF signal it delivers to the active antenna. The switch 1502 behaves as a low impedance load and the phase (of the phase and amplitude) should be consistent with this value. In other words, the RF current should be relatively large, the voltage relatively low, and the phase between the current and voltage should be zero degrees (in phase). If the compensation length is too short or too long, the current will be low, the voltage high, and the phase between the current and voltage will either be positive above zero or negative below zero. The reader's controller 222 adjusts the shunt switches 802 of the length compensation unit 215 to get the phase angle as close to zero as possible, at which point the length compensation will be at the best achievable setting.

Since the length compensation will remain fixed unless antennas or cables are physically moved or altered, the compensation settings will mostly not change once set. Mechanical latched relays can be used in this application so that relays can be latched and stay set. In this case the adjustments can be made at power up, and thereafter only infrequently if required. The configuration is advantageously saved on power down by the latching relays.

Unbalanced to balanced operation of the length compensation can be achieved by placing a balun between the compensation unit 215 and the antenna 206. The cable 208, bypass switch 214 and compensation unit 215 operate unbalanced whilst the antenna 206 can operate in a balanced state. Balanced operation has been found to be beneficial for reducing interference at, and stray coupling from, the antenna 206. The circuit of FIG. 15 provides for unbalanced operation, and the circuit of FIG. 16 provides for balanced operation.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. An RFID system comprising:
   an RFID reader configured to interrogate RFID antennas;
   a series of cable links;
      an antenna array comprising two or more RFID antennas serially connectable to the RFID reader via said series of cable links, each RFID antenna associated with a respective cable link, said respective cable link being the last one of the series of cable links in the connection from the RFID reader to the respective RFID antenna, each cable link having a respective cable length;
   a respective length compensation unit associated with each RFID antenna, and connected between the RFID antenna and the respective associated cable link, the length compensation unit configured to adjust a total cable length between the RFID reader and a respective RFID antenna to be an effective cable length, the total cable length comprising a sum of cable lengths for each cable link of the series of cable links connecting the RFID reader and the respective RFID antenna.

2. The RFID system of claim 1,
   wherein each RFID antenna has an antenna impedance, and each antenna's respective cable link has a cable impedance, and the antenna impedance is different to the cable impedance so that each RFID antenna and its respective cable link are impedance mismatched, and wherein the length compensation unit associated with each RFID antenna is configured to adjust for the total cable length between the RFID reader and the respective RFID antenna so that reflection resulting from said impedance mismatch has a predefined phase.

3. The RFID system of claim 2, wherein the antenna impedance of the respective RFID antenna is transformed along the effective cable length to a final impedance having a resistance and substantially no reactance.

4. The RFID system of claim 2, wherein the antenna impedance equals an antenna resistance without reactance, and the antenna impedance is transformed along the effective cable length to have intermediate impedance values including reactance, and wherein the final impedance is substantially equal to the antenna resistance without reactance.

5. The RFID system of claim 1, the system further comprising a controller configured to activate one RFID antenna at a time by communicating a first control signal to the antenna array.

6. The RFID system of claim 5, further comprising a bypass switch associated with each RFID antenna, the bypass switch being responsive to the first control signal so as to either bypass the respective RFID antenna or connect the respective RFID antenna to the RFID reader.

7. The RFID system of claim 5, wherein the total cable length is a variable length depending on which one of the two or more RFID antennas is an active antenna.

8. The RFID system of claim 7, wherein the length compensation unit associated with the active antenna adjusts the total cable length between the RFID reader and the active antenna to be the effective cable length.

9. The RFID system of claim 1, wherein the length compensation unit comprises a configuration of reactive electronic components that emulate a lengthening or shortening of the total cable length.

10. The RFID system of claim 1,
wherein one of the two or more RFID antennas is an active antenna and the effective cable length is the sum of the total cable length and a compensation length provided by the length compensation unit of the active antenna, and
wherein the effective cable length is substantially equal to a defined length.

11. The RFID system of claim 10, wherein each length compensation unit is configured to have a different compensation length, each unit's compensation length being a function of a number of cable links between said compensation unit and the RFID reader.

12. The RFID system of claim 10, wherein the compensation length of each length compensation unit is adjustable.

13. The RFID system of claim 1, wherein the two or more RFID antennas of the antenna array are connected in a daisy chain configuration via the series of cable links.

14. The RFID system of claim 5, wherein the controller is further configured to communicate a second control signal to at least one length compensation unit for setting an adjustable compensation length of the at least one unit.

* * * * *